United States Patent
Lee et al.

(10) Patent No.: US 8,213,354 B2
(45) Date of Patent: Jul. 3, 2012

(54) METHOD FOR TRANSMISSION OF ACK/NACK FOR UPLINK ENHANCEMENT IN A TDD MOBILE COMMUNICATION SYSTEM

(75) Inventors: Hye-Young Lee, Seoul (KR); Seong-Ill Park, Seongnam-si (KR); Ju-Ho Lee, Suwon-si (KR); Jin-Weon Chang, Suwon-si (KR); Young-Bin Chang, Seoul (KR); Jin-Seok Lee, Seongnam-si (KR); Song-Hun Kim, Suwon-si (KR); Kwang-Yung Jeong, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1242 days.

(21) Appl. No.: 11/064,751

(22) Filed: Feb. 16, 2005

(65) Prior Publication Data

US 2005/0201319 A1    Sep. 15, 2005

(30) Foreign Application Priority Data

Feb. 17, 2004 (KR) .......................... 10-2004-0010383

(51) Int. Cl.
*H04B 7/212* (2006.01)
(52) U.S. Cl. ...................................................... 370/321
(58) Field of Classification Search .................. 370/321, 370/342, 347, 252, 335, 320, 329, 310, 336, 370/314, 229, 389, 331, 276, 392, 337, 310.2; 714/746, 747, 748, 749
See application file for complete search history.

(56) References Cited

U.S. PATENT DOCUMENTS

| | | | | |
|---|---|---|---|---|
| 5,742,592 A * | 4/1998 | Scholefield et al. | ........... | 370/329 |
| 6,021,124 A * | 2/2000 | Haartsen | ........................ | 370/336 |
| 6,339,612 B1 * | 1/2002 | Stewart et al. | ................. | 375/140 |
| 6,781,975 B1 * | 8/2004 | Baier et al. | ...................... | 370/335 |
| 7,062,294 B1 * | 6/2006 | Rogard et al. | .............. | 455/562.1 |
| 7,068,618 B2 * | 6/2006 | Zeira et al. | ...................... | 370/321 |
| 7,130,588 B2 * | 10/2006 | Niwano | ....................... | 455/67.11 |
| 7,158,802 B2 * | 1/2007 | Dick et al. | ....................... | 455/509 |
| 7,301,988 B2 * | 11/2007 | Kanterakis | ...................... | 375/141 |
| 2002/0141367 A1* | 10/2002 | Hwang et al. | .................. | 370/335 |
| 2002/0154610 A1* | 10/2002 | Tiedemann et al. | ........... | 370/329 |
| 2002/0172192 A1* | 11/2002 | Hunzinger et al. | ............ | 370/352 |
| 2003/0043778 A1* | 3/2003 | Luschi et al. | ................... | 370/349 |
| 2003/0165120 A1 | 9/2003 | Uesugi et al. | | |
| 2003/0210668 A1* | 11/2003 | Malladi et al. | ................. | 370/335 |
| 2004/0018850 A1* | 1/2004 | Ishiguro et al. | ................ | 455/522 |
| 2005/0041694 A1* | 2/2005 | Liu | ................................. | 370/524 |
| 2006/0176866 A1* | 8/2006 | Wakabayashi | ................. | 370/342 |

FOREIGN PATENT DOCUMENTS

| | | |
|---|---|---|
| KR | 1020010031752 | 4/2001 |
| KR | 1020020075647 | 10/2002 |
| KR | 1020030037398 | 5/2003 |

* cited by examiner

*Primary Examiner* — Kwang B Yao
*Assistant Examiner* — Anh Ngoc Nguyen
(74) *Attorney, Agent, or Firm* — The Farrell Law Firm, P.C.

(57) ABSTRACT

Disclosed is a structure of a downlink common channel for transmitting an ACK/NACK to notify whether retransmission should be performed through a transmission position of the downlink common channel according to a channel code of a time slot allocated to a UE, and a method for distinguishing an ACK from a NACK, in using a HARQ scheme for uplink transmission of a TDD CDMA scheme in a 3G mobile communication.

9 Claims, 10 Drawing Sheets

METHOD FOR TRANSMISSION OF ACK/NACK FOR UPLINK ENHANCEMENT IN A TDD MOBILE COMMUNICATION SYSTEM

PRIORITY

This application claims priority to an application entitled "Method for Transmission of ACK/NACK for Uplink Enhancement in TDD Mobile Communication System" filed in the Korean Intellectual Property Office on Feb. 17, 2004 and assigned Serial No. 2004-10383, the contents of which are incorporated herein by reference.

BACKGROUND OF THE INVENTION

1. Field of the Invention

The present invention relates to a method for transmitting Acknowledge/Negative-Acknowledge signal (ACK/NACK), which represents whether uplink data must be retransmitted, through a downlink common channel to use a Hybrid Automatic Repeat Request (HARQ) scheme according to an uplink enhancement in a Code Division Multiple Access (CDMA) mobile communication system using a Time Division Duplexing (TDD) scheme.

2. Description of the Related Art 3G mobile communication provides both voice and packet-data service using a CDMA scheme. The 3G mobile communication scheme may be classified into a Universal Mobile Telecommunication Service (UMTS) scheme and a CDMA 2000 scheme. The UMTS is a standard scheme in Europe and Japan, is based on synchronization between nodes Bs and conforms to a $3^{rd}$ Generation Partnership Project (3GPP) standard. The CDMA 2000 is a standard scheme in the US, is based on asynchronization between nodesBs and conforms to a 3GPP2 standard.

In the 3G mobile communication, a 3GPP includes a Frequency Division Duplexing (FDD) scheme allowing uplink/downlink transmission/reception to be differentiated by frequency and a TDD scheme allowing uplink/downlink transmission/reception to be differentiated by time. Herein, the TDD scheme includes a High Chip Rate TDD (HCR-TDD) using a chip rate of 3.84 Mcps (Mega chip per second) and a Low Chip Rate TDD (LCR-TDD) using a chip rate of 1.28 Mcps.

In the 3G mobile communication scheme, with increasing demand for data-packet services via mobile communication and the increase in data size, a High Speed Downlink Packet Access (HSDPA) scheme has been proposed that transmits data more efficiently and rapidly using the UMTS scheme. In addition, standardization for the HSDPA scheme has been discussed in the 3GPP. Under the HSDPA scheme, it is possible to efficiently transmit data through a downlink at a high speed. However, there is also a need for a faster data transmission rate through the uplink for interactive multimedia services.

In response, an uplink enhancement has been proposed to transmit data through the uplink at higher speeds. In addition, to improve the performance of packet transmission, a HARQ scheme is used together with the uplink enhancement. Furthermore, in order to use the HARQ scheme, control information must be transmitted downward. Herein, the control information is information sent from a node B to User Equipment (UE) and indicates whether data sent from the UE has been successfully received by the node B.

FIG. 1 is a diagram illustrating a HARQ scheme in an uplink enhancement.

Referring to FIG. 1, a UE 102 transmits data through an uplink enhancement channel 103 allocated by a node B 101. After the data is transmitted, the node B 101 determines whether the received data has an error. As a result of the determination, when the data have been received without an error, the node B 101 transmits an ACK to the UE 102. In contrast, when the data does have an error, the node B 101 transmits a NACK (104) to the UE 102. The ACK/NACK is transmitted through a downlink channel and the downlink channel may transmit only the ACK/NACK or transmit the ACK/NACK together with another signaling information. Then, when the ACK is received from the node B 101, the UE 102 transmits new data. In contrast, when the NACK is received from the node B 101, the UE 102 transmits the previously transmitted data (105).

To decrease the delay of data transmission when the HARQ scheme is used, a N-channel Stop and Wait (NSW) HARQ scheme of continuously transmitting N data blocks and waiting for the transmission responses in turn is used. The NSW HARQ scheme is controlled by a node B.

FIG. 2 is a diagram illustrating a conceptual operation of a NSW HARQ scheme when data are transmitted to a node B through an uplink.

Referring to FIG. 2, in a UE, data blocks transferred from an upper layer are stored in a buffer 201. The data stored in the buffer 201 are sequentially distributed to a number of HARQ processes 202 to a HARQ process 204. The number N of HARQ processes is determined considering a delay time it takes to receive a response when transmitting data between the UE and the node B. N may be equal to or greater than 2.

The data 206 processed in the HARQ process 202 is transmitted through an uplink enhancement channel during one Transmission Time Interval (TTI). After transmitting the data 206, the UE transmits the data 207 processed in the HARQ process 203 when the next TTI comes. In this way, the UE transmits the data processed in from the HARQ process 202 to the HARQ process 204, which is the last process, during the time interval N*TTI 211. Herein, during data transmission, the UE does not receive responses for the transmitted data. Further, while the data is continuously transmitted, the node B sequentially receives the data from the first transmitted data 206 to the last transmitted data 209.

When receiving the data 206, the node B judges whether the data 206 has an error. Herein, when the node B fails in a CRC (Cyclic Redundancy Check) examination of the data 206, the node B determines that the data 206 has an error. In contrast, when the node B succeeds in the CRC examination of the data 206, the node B determines that the data 206 is received without error. Then, the node B transmits an ACK/NACK 212 indicating whether an error has occurred in the data to the UE through a downlink channel 210 (212).

The ACK/NACK 212 is transmitted through the downlink channel 210 and must be transmitted within the N*TTI 211 after the first data 206 have been transmitted. The ACK/NACK determination is also performed for the next received data 207. In this way, the ACK/NACK determination is performed for each data sequentially transmitted from the N HARQ processes 202 to 204, so that the ACK/NACK is independently transmitted.

The ACK/NACK 213 for the data 207 is transmitted through the downlink channel 210 during the next TTI after the ACK/NACK 212 has been transmitted. When the UE receives the ACK/NACK 212 at a reception position of the downlink channel 210 corresponding to the data 206, the UE transmits new data or retransmission data in an interval 208 corresponding to the HARQ process 202 according to the ACK/NACK 212. The aforementioned operation is also performed for the ACK/NACK 213 and the ACK/NACK 213 takes part in whether the data 207 processed in the HARQ process 203 is retransmitted. That is, new/retransmission data according to the ACK/NACK 213 are transmitted in an interval 209 corresponding to the HARQ process 203.

The ACK/NACK transmitted through the downlink channel is information for determining whether an uplink data block should be retransmitted. If an error occurs in the ACK/NACK, correct data may be unnecessarily retransmitted or it may be impossible to transmit a data needing retransmission. Accordingly, the ACK/NACK is as important as the data block. Further, the ACK/NACK must have a very low Block Error Rate (BLER) as compared to the data block.

The ACK/NACK may be expressed by one bit representing an ACK or a NACK. The ACK or the NACK of one bit passes through a channel coding process in order to be transmitted at a low error rate. In the channel coding process, the ACK/NACK is carried by a plurality of coding bits, so that a receiver can receive the ACK/NACK at a low error rate. A repetition coding method may be used for a channel coding of the ACK/NACK. In the repetition coding, one bit is repeatedly transmitted by the number of bits to be transmitted. Repetition coding may be usefully utilized when information to be transmitted has only two types (e.g., 0 or 1), similarly to the transmission of the ACK/NACK, because a coding process in a transmitter and a decoding process in a receiver is simple and easy to implement.

The ACK/NACK having passed through the channel coding process is transmitted through a downlink physical channel to which a downlink channel is mapped. The downlink physical channel is allocated in advance when the node B and the UE start to communicate with each other and set to a radio link.

In a method for determining an uplink/downlink channel between the node B and the UE, from among time slots, a specific channelization code in time slots used for downlink transmission is set as a downlink channel and a specific channelization code in time slots used for uplink transmission is set as an uplink channel. The uplink/downlink channels having been set between the node B and the UE may be reset in a unit of each radio frame or set again after several radio frames. The repetition period of the uplink/downlink channels between the node B and the UE and the number of radio frames during an interval between resetting of the uplink/downlink channels may be determined according to the property and amount of data transmitted between the node B and the UE. For example, when the amount of uplink transmission data is large and the amount of downlink transmission data is small, the uplink channel may be frequently reset as compared to the downlink channel.

For uplink enhancement, many uplink channels are allocated and the downlink channels are minimally used. A downlink channel required for uplink enhancement is a channel for transmitting signaling information required for the uplink enhancement, and the required number of the downlink channels may change according to the property and amount of the signaling information. Accordingly, it is necessary to provide technology for effectively transmitting the ACK/NACK through a downlink channel as signaling information for the uplink enhancement.

SUMMARY OF THE INVENTION

Accordingly, the present invention has been made to solve the above-mentioned problems occurring in the prior art, and it is an object of the present invention to provide a method for transmitting an ACK/NACK, which represents whether data received through an uplink enhanced channel has an error, through a downlink common channel in a mobile communication system supporting an uplink high packet transmission.

It is another object of the present invention to provide a structure of a downlink common channel for transmitting an ACK/NACK for enhanced uplink packet data, and a method for distinguishing the ACK and the NACK from each other in the downlink common channel.

In accordance with one aspect of the present invention, there is provided a method for transmitting an Acknowledge/Negative-Acknowledge (ACK/NACK) for uplink packet data in a Time Division Duplexing (TDD) mobile communication system, the method including the steps of: receiving the uplink packet data through a code channel determined by an allocated time slot and an allocated channel code; generating ACK/NACK information representing whether the uplink packet data include an error; and transmitting the ACK/NACK information from a transmission position corresponding to the code channel of a downlink common channel.

In accordance with another aspect of the present invention, there is provided a method for transmitting an Acknowledge/Negative-Acknowledge (ACK/NACK) for uplink packet data in a Time Division Duplexing (TDD) mobile communication system, the method including the steps of: dividing each of two data transmission portion included in a downlink common channel into transmission positions corresponding to a plurality of code channels determined by different combinations of time slots and channel codes allocated to User Equipments (UEs), the downlink common channel including a time slot having the two data transmission portions and a midamble portion disposed between the two data transmission portions; receiving the uplink packet data through one of the code channels; and transmitting ACK/NACK information from a transmission position, which corresponds to a code channel through which the uplink packet data are received, from among the transmission positions of the downlink common channel, the ACK/NACK information representing whether the uplink packet data include an error.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may make the subject matter of the present invention unclear. Terms used herein are defined considering functions in the present invention and may change according to the intention of a user/an operator or custom.

The present invention has main characteristics in which an ACK/NACK, which represents whether data transmitted upward should be retransmitted, is transmitted through a downlink common channel when a HARQ is used in performing uplink enhancement. That is, when a TDD system uses the HARQ in order to improve the efficiency of uplink packet transmission for uplink enhancement, the present invention proposes a structure of a downlink common channel used for transmitting an ACK/NACK notifying whether the data must be retransmitted, and a method for distinguishing the ACK from the NACK transmitted through the downlink common channel.

Figure 1:
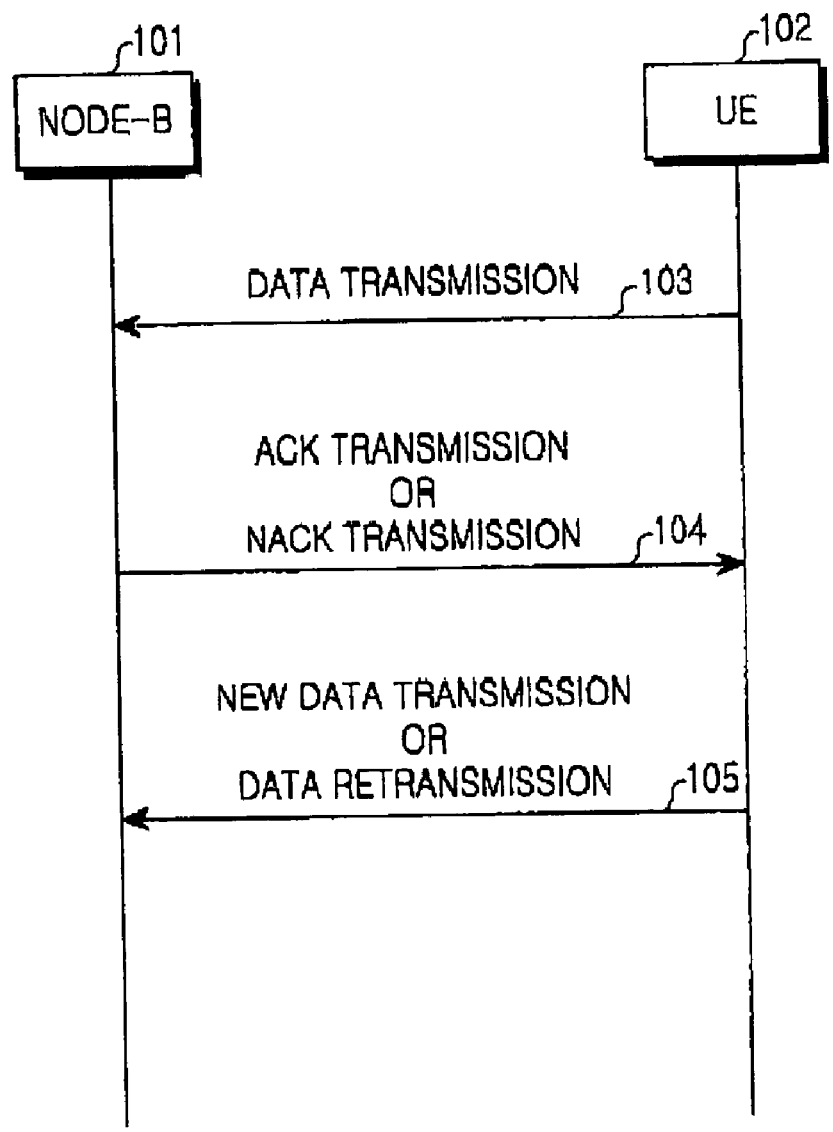
FIG. 1 is a diagram illustrating a HARQ scheme in an uplink enhancement.
Figure 2:
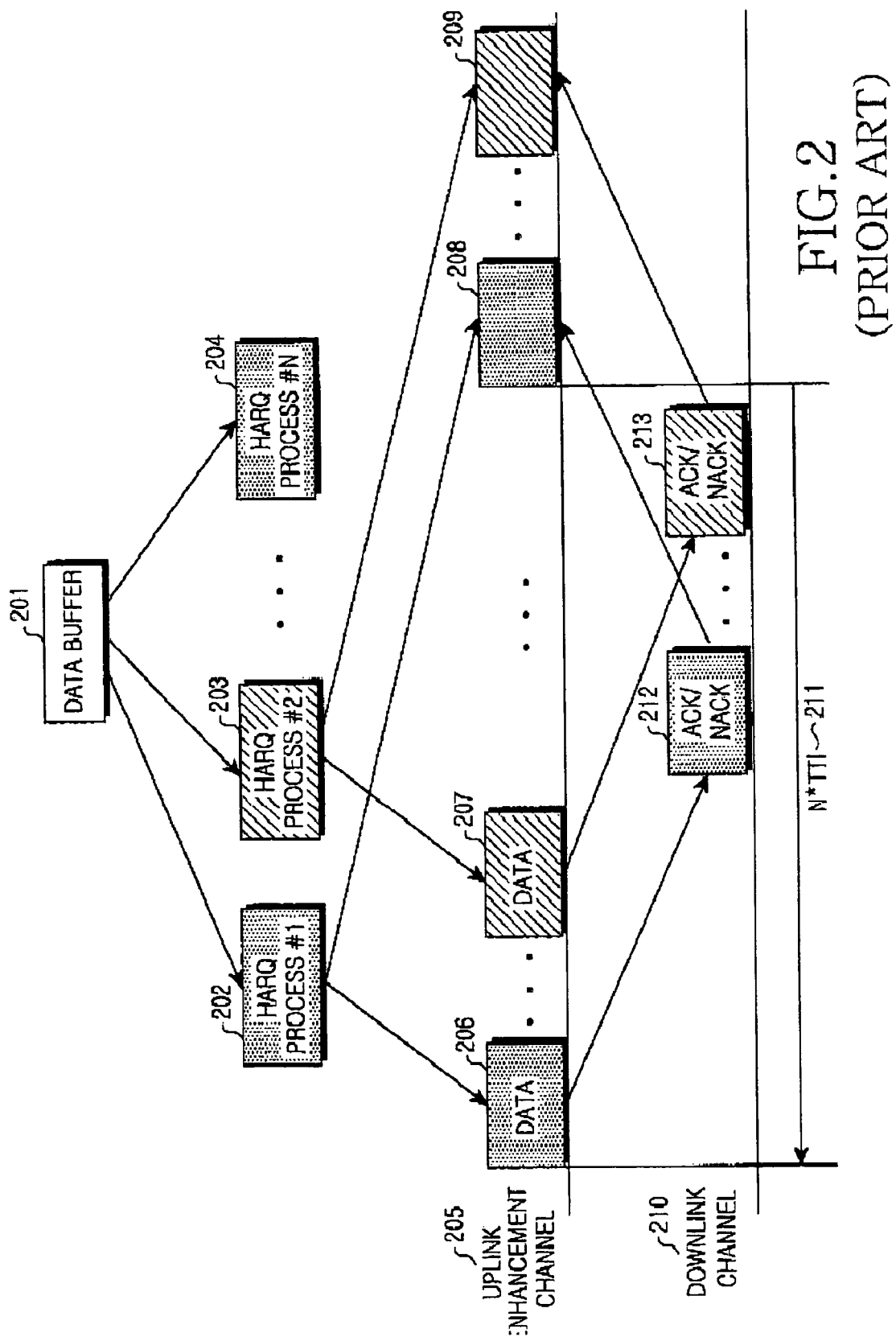
FIG. 2 is a diagram illustrating a conceptual operation of a NSW HARQ scheme when a UE transmits data to a node B through an uplink.
Figure 3:
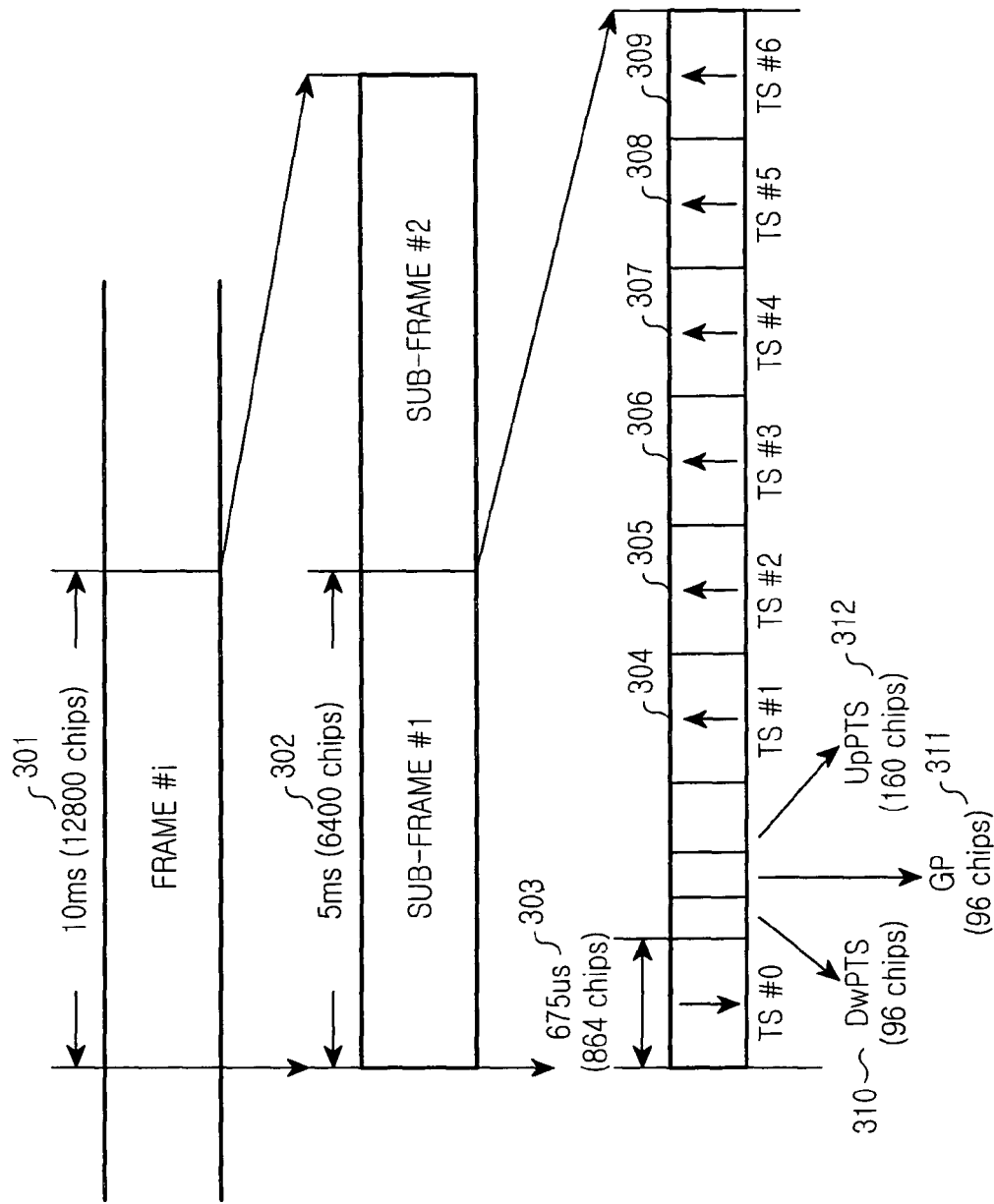
FIG. 3 is a diagram illustrating the structure of a frame in a LCR-TDD system in a mobile communication system according to an embodiment of the present invention.

FIG. 3 is a diagram showing the structure of a frame used as a basic unit of wireless transmission in an LCR-TDD system of a TDD system standardized in a 3GPP according to an embodiment of the present invention.

Referring to FIG. 3, one frame 301 has a length of 10 ms, that is, 12800 chips according to 1.28 Mcps which is the chip rate used in the LCR-TDD system, and includes two subframes, each of which has a length of 5 ms. The subframe 302 is one of the two subframes included in the frame 301 and the two subframes have the same structure. The subframe 302 has a length of 5 ms and includes seven time slots 303 to 309, a Downlink Pilot Time Slot ("DwPTS") 310, an Uplink Pilot Time Slot ("UpPTS") 312, and a Guard Period ("GP") 311 disposed between the DwPTS 310 and the UpPTS 312. Each of the time slots 303 to 309 has a length of 864 chips, that is, 675 micro seconds, and is used for uplink transmission from a UE to a node B or downlink transmission from a node B to a UE. In FIG. 3, an upward arrow represents an uplink transmission time slot and a downward arrow represents a downlink transmission time slot.

The number of time slots 303 to 309 allocated in downlink transmission or uplink transmission is set according to a ratio of uplink transmission data downlink transmission data by system. In setting the time slots to be used for uplink transmission or downlink transmission, the first time slot 303 (TS #0) used for downlink transmission and the second time slot 304 (TS #1) is used for uplink transmission. The other time slots 305 to 309 (TS #2 to TS #6), without using TS #0 and the TS #1, may be used for both uplink transmission and downlink transmission.

Herein, the LCR-TDD system uses a switching point for conversion of uplink/downlink transmission and one subframe may include only two switching points. The first switching point is fixed between the DwPTS 310 and the UpPTS 312 and the second switching point exists in a random position between the TS #1 and the TS #6 according to the ratio of uplink transmission data to downlink transmission data in node B. For uplink enhancement, since high speed uplink transmission is desired, many time slots are allocated for uplink transmission.

The DwPTS 310, the GP 311 and the UpPTS 312 exist between the TS #0 and the TS #1. The DwPTS 310 is used for an initial cell searching, synchronization or channel estimation in a UE and the UpPTS 312 is used for channel estimation in a node B and synchronization for uplink transmission of a UE. Since the adjacent DwPTS 310 and UpPTS 312 are respectively used for downlink and uplink transmission, the GP 311 is used for removing interference occurring in the uplink transmission due to multi-path delay of downlink transmission signals between uplink and downlink transmission.

The big difference between a HCR TDD and a LCR TDD is the bandwidth used in transmission of data. That is, the LCR TDD uses a bandwidth of 1.28 MHz and the HCR TDD uses a bandwidth of 3.84 MHz. Further, the HCR TDD does not include the DwPTS and the UpPTS, and separately includes a synchronization channel for synchronization, in contrast with the LCR TDD.

Figure 4:
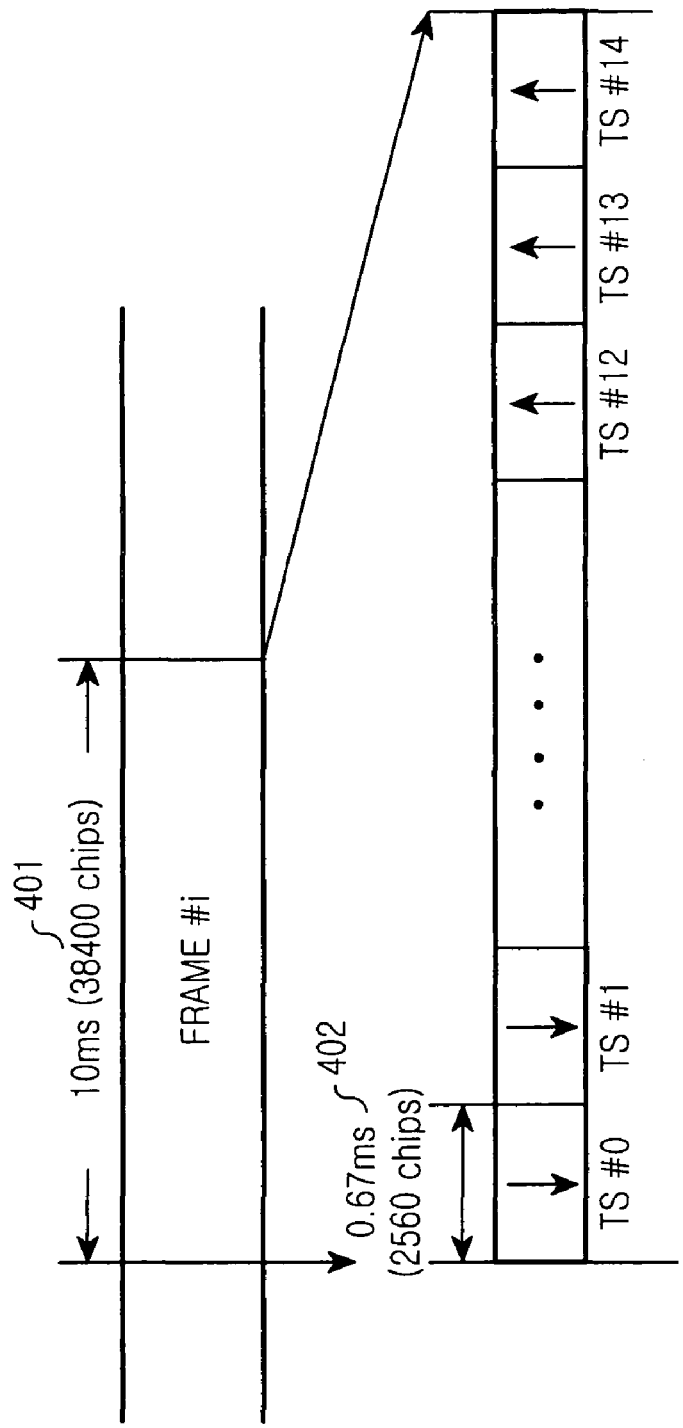
FIG. 4 is a diagram illustrating the structure of a frame in a HCR-TDD system in a mobile communication system to which the present invention is applied.

FIG. 4 is a diagram showing the structure of a frame of a HCR-TDD system of a TDD system standardized in a 3GPP according to an embodiment of the present invention.

Referring to FIG. 4, the frame 401 has a length of 10 ms, that is, 38400 chips, and includes 15 time slots. The time slot 402 in FIG. 4 has a length of 0.67 ms, that is, 2560 chips, and is allocated for uplink or downlink transmission. In contrast with the LCR TDD, all time slots of the HCR TDD are used for uplink transmission or downlink transmission without limitation. Further, in the LCR TDD, one subframe includes only two switching points to indicate a conversion position of uplink and downlink transmission. However, the HCR TDD has no limit on the number of switching points. Even in the case of the HCR TDD, many uplink transmission time slots are allocated as compared to downlink transmission time slots for uplink enhancement.

Figure 5:
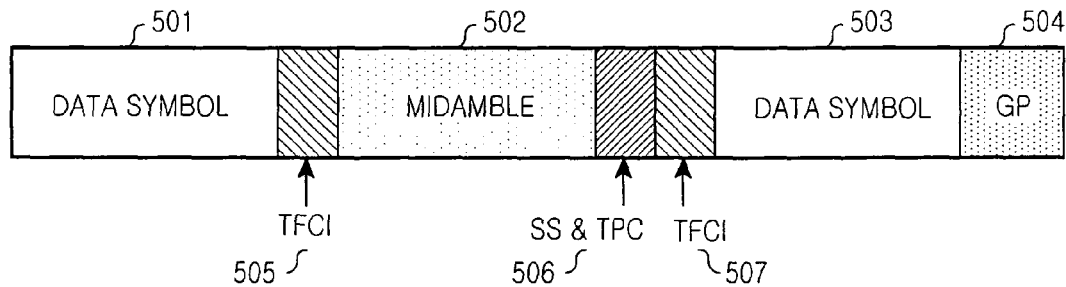
FIG. 5 is a diagram illustrating the general structure of a time slot in a TDD system according to an embodiment of the present invention.

FIG. 5 is a diagram showing the structure of a time slot in a TDD system according to an embodiment of the present invention. The time slot has the same structure in transmission and downlink transmission.

The data transmission portions 501 and 503 in FIG. 5 are used for both uplink and downlink transmission data. Reference numbers 505 and 507 are portions for transmitting Transport Format Combination Indicators (TFCIs). The TFCI plays a role in indicating the data transmission rate for the downlink channel transmitted from node B to a UE. Further, when a downlink channel is transmitted through plural channel codes, the TFCI is used to indicate the transmission rate of each channel code and the properties of the data. The TFCI does the same for an uplink channel. Further, in uplink transmission of the TDD system, the midamble portion 502 is used when distinguishing UEs using the same time slots.

In uplink and downlink transmission, the midamble portion 502 is used for a channel estimation. In downlink transmission, the midamble portion 502 is also used for measuring loss on a channel path from node B to a UE and for distinguishing node Bs from each other. Further, the midamble portion 502 includes a predetermined specific sequence and the specific sequence has 128 types. The sequence of the midamble is not band-spread by a channel code.

A Synchronization Shift (SS) & Transmit Power Control Commander (TPC) 506 is transmitted just after the midamble portion 502. When the synchronization between the UE and the node B fails from movement or other reasons during transmission, the SS is used for transmitting a command for adjusting synchronization. Accordingly, the UE may adjust the synchronization in a unit of ⅛ chip by means of the command transmitted through the SS.

When data is transmitted upward, the TPC is used for controlling downlink transmission power of the node B. In contrast, when data is transmitted downward, the TPC is used for controlling uplink transmission power of the UE.

GP 504 is a period of time for differentiating between a current slot and the next transmitted slot. In addition, when a downlink transmission slot comes after an uplink transmission slot or an uplink transmission slot comes after a downlink transmission slot, the GP 504 plays a role of preventing the uplink transmission slot and the downlink transmission slot from interfering with each other.

The structure of the time slot of FIG. 5 is used for a dedicated physical channel as well as for a common physical channel. The present invention uses a downlink common channel basically having the structure of the time slot of FIG. 5 to transmit an ACK/NACK.

Figure 6:
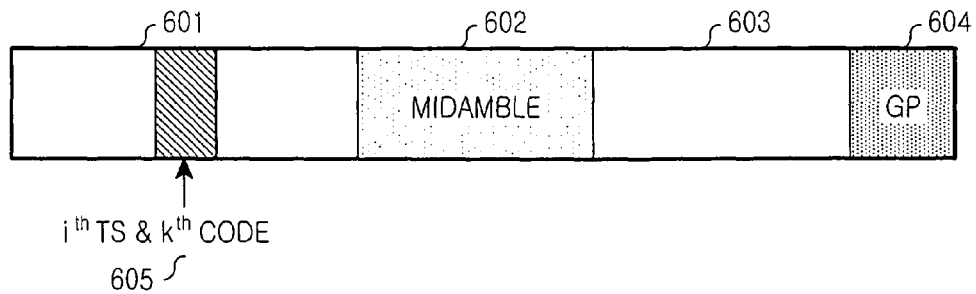
FIG. 6 is a diagram illustrating the structure of a common channel used for transmitting an ACK/NACK according to an embodiment of the present invention.

FIG. 6 is a diagram showing the structure of a common channel used for transmitting an ACK/NACK according to a preferred embodiment of the present invention. FIG. 6 shows a downlink time slot allocated in a downlink common channel.

Referring to FIG. 6, the data transmission portions 601 and 603, the midamble portion 602 and the GP 604 are equal to the data transmission portions 501 and 503, the midamble portion 502 and the GP 504 in FIG. 5. The TFCI 505 and 507 and the SS & TPC 506 are not used in the common channel structure for transmission of the ACK/NACK. The data transmission portions 601 and 603 transmit ACKs/NACKs of UEs using a HARQ for uplink enhancement instead of user data. Herein, the data transmission portions 601 and 603 have predetermined positions from which the ACKs/NACKs of the UEs are transmitted and the positions are determined by the combination of uplink time slots and channel codes allocated for the UEs.

Specifically, a UE using a HARQ transmits packet data to a node B by means of a $k^{th}$ channel code in an $i^{th}$ time slot. Then, an ACK/NACK for the packet data is transmitted from the node B to the UE. The node B uses a downlink common channel having the structure as shown in FIG. 6 to transmit the ACK/NACK. The ACK/NACK transmitted through the downlink common channel is disposed at a predetermined position of a time slot allocated in the downlink common channel. Herein, the predetermined position is a transmission position defined according to each corresponding time slot and channel code and may include one or more bits.

That is, the ACK/NACK is information for data transmitted through a specific time slot and channel code. The transmission position of the ACK/NACK is determined according to the channel code and the time slot used for transmission of the data. In the downlink common channel, at least one transmission position corresponds to a combination of time slots and channel codes. Accordingly, when the UE transmits data by means of the $k^{th}$ channel code in the $i^{th}$ time slot, the ACK/NACK corresponding to the data is included in a specific position 605 corresponding to the $k^{th}$ channel code in the $i^{th}$ time slot and then transmitted. The position determination according to the time slot and the channel code will be described in detail below.

When the downlink common channel is used for transmission of the ACK/NACK, UEs, which must receive information for the ACK/NACK, determine whether to receive the ACK/NACK. That is, since the common channel is used for the transmission of the ACK/NACK, the UEs receiving the ACK/NACK should recognize that the ACK/NACK is transmitted to the UEs so that the UEs can properly receive the ACK/NACK.

To this end, it is possible to use several methods for recognizing a relation between the ACK/NACK and the UE. In one method, a position to which the ACK/NACK is transmitted may be notified to the UE through an upper layer signaling. However, the ACK/NACK is information for notifying whether a data packet must be retransmitted. To be effective, the UE should receive the ACK/NACK within a predetermined time, quickly process the received ACK/NACK, determine whether to retransmit data, and thus determine whether to process new data or retransmit data by a HARQ process. When the transmission position of the ACK/NACK is notified through the signaling, a time delay occurs in receiving the signaling information. Further, since signaling information is received from an upper layer in each transmission of the ACK/NACK, there is a large signaling overhead. Therefore, the present invention proposes a method for allowing the transmission position of the ACK/NACK to be recognized without separate signaling.

In the above description, the repetition coding is used for transmitting one bit at a low error rate when the ACK/NACK is transmitted. When the repetition coding is used, the number of bits used for transmitting the ACK/NACK is determined. In other words, the number of transmitted bits of the ACK/NACK is determined. The number of bits is M. M represents repetition of an ACK/NACK of one bit. If the ACK/NACK to be transmitted is 1 and M is 4, ACK/NACK information transmitted through the downlink common channel is 1111.

As the value of M increases, the ACK/NACK becomes less prone to error. That is, when M increases, even though an error occurs in one bit of the ACK/NACK information, the original ACK/NACK may be determined from the other bits. In other words, as M increases, error rate decreases. However, since the total number of bits that can be transmitted through one downlink common channel is fixed, the total number of ACK/NACKs that can be transmitted decreases.

Since M is larger than 2, a node B may determine M according to channel environments of a current cell and the number of UEs using uplink enhancement. When channel environments of UEs within a radius of a cell controlled by the node B are favorable, it is possible to obtain a sufficient reception rate even when M is small. Further, when many UEs in a cell use the uplink enhancement, the ACK/NACK information is transmitted to the UEs. Therefore, it is necessary to decrease M to increase the number of the ACK/NACK transmitted.

Accordingly, the node B determines M considering the channel environments and the number of the UEs and notifies the UEs in the cell of the M value. However, when M frequently changes according to the change of the channel environments, the UEs in the cell should receive the signaling information of the upper layer, creating a signaling overhead. So, when selecting the value of M, the node B selects a proper value and then maintains the selected value if possible. In an alternative embodiment, M is selected by an upper system and then may be the node B and the UEs are notified of the selected M value.

Figure 7A:
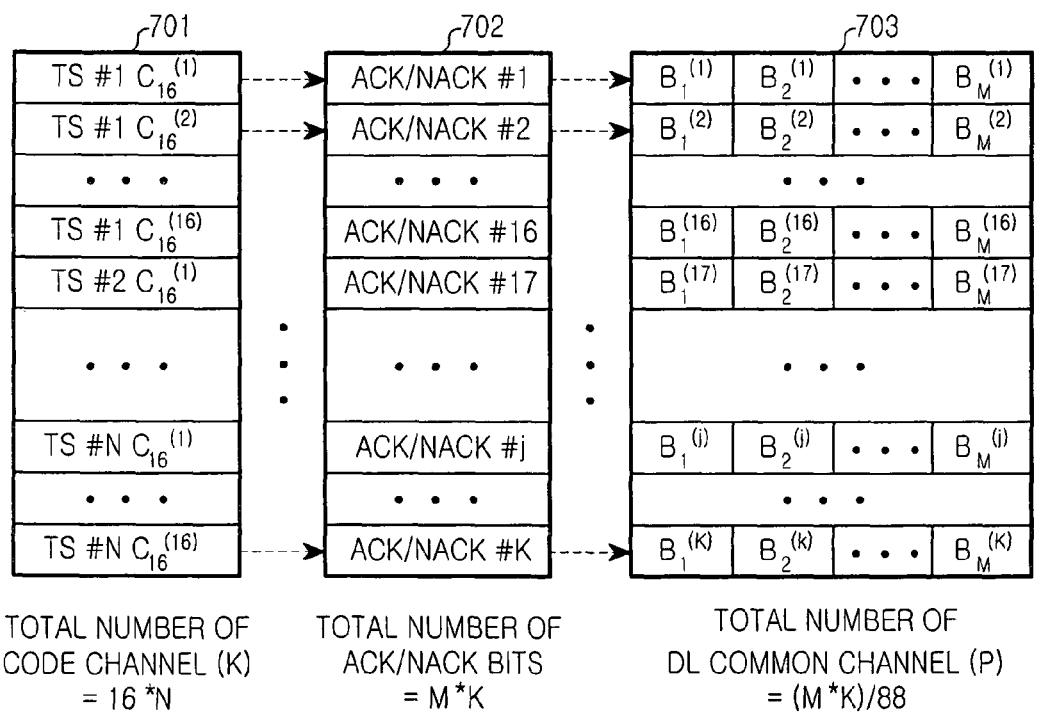
FIGS. 7A and 7B are diagrams illustrating a position relation between channel codes of each time slot and an ACK/NACK and a method for allowing the ACK/NACK to correspond to a downlink common channel according to a preferred embodiment of the present invention.
Figure 7B:
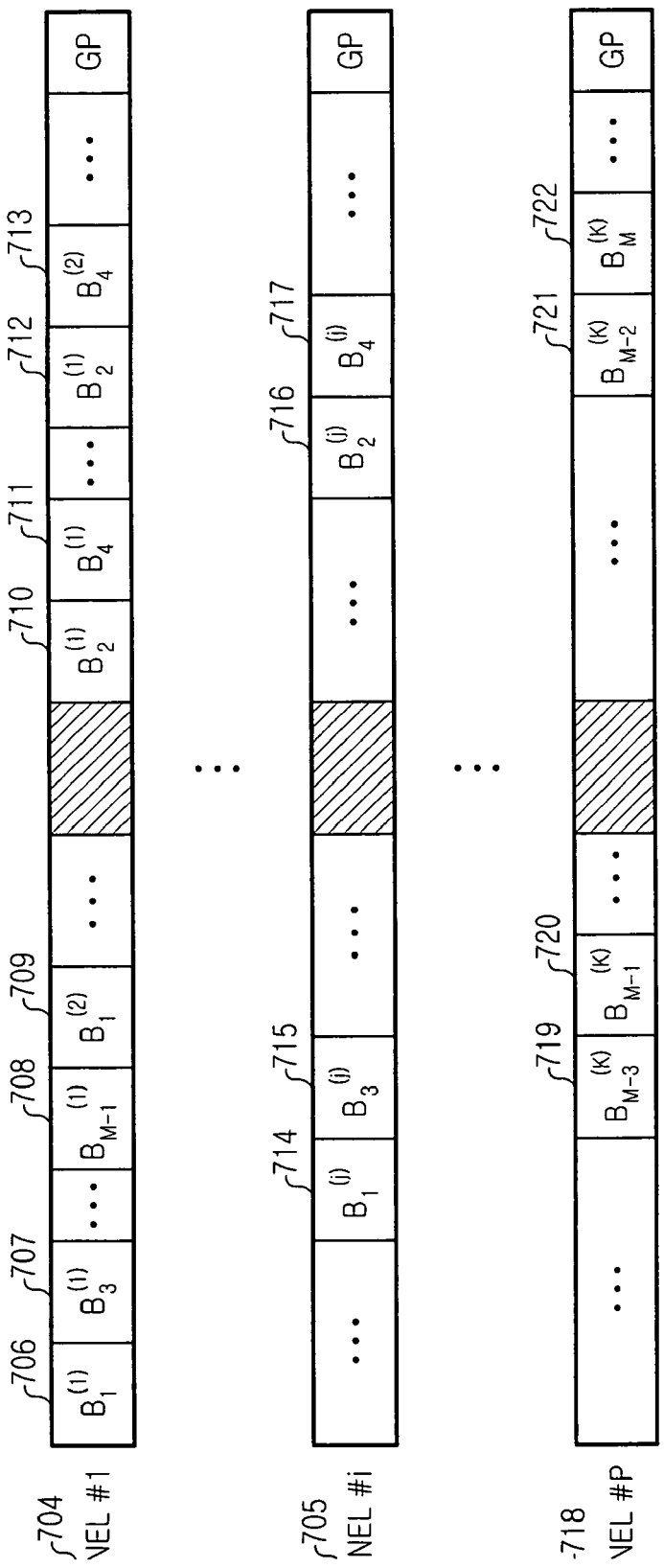

FIGS. 7A and 7B are diagrams illustrating a positional relationship between channel codes of a time slot and an ACK/NACK according to a preferred embodiment of the present invention.

Referring to FIG. 7A, a reference number 701 represents that N time slots are used for uplink enhancement and code channels, which are defined as channel codes of each time slot allocated for uplink transmission, and are sequentially aligned from the first code to the 16$^{th}$ code when a Spreading Factor (SF) is 16. Since each channel code of the code channels 701 is for uplink transmission, UEs transmit packet data to a node B by means of each channel code. The data of each channel code transmitted from the UE are demodulated by the node B. Further, the node B determines whether the received data include an error and determines an ACK/NACK for the data transmitted through each channel code. Herein, since the determined values of the ACK/NACK correspond to each channel code having been transmitted upward, the values of the ACK/NACK determined by the node B may be sequentially aligned according to a channel code of a corresponding time slot as shown in a reference number 702. Herein, since 16 channel codes correspond to one time slot, the total number of code channels is 16*N. The total number of code channels is defined as a K.

Data is transmitted by means of the total K number of code channels and K number of ACKs/NACKs existing for each channel. K number of ACKs/NACKs pass through a channel coding process for uplink transmission. Herein, since the channel coding process uses a repetition coding as described above, the ACKs/NACKs change into encoded bits having a length of M in one information bit. Reference number 703 shows encoded bits generated from the ACKs/NACKs 702. The B of the reference number 703 means an encoded bit, a subscript of the B represents a bit number and a superscript of the B represents a number of the ACK/NACK. For example, a $B_3^{(10)}$ means the third bit of encoded bits of the ACK/NACK for the 10$^{th}$ code channel.

The encoded ACK/NACK bits are transmitted to UEs in a cell through a downlink common channel. The downlink common channel has the structure as described in FIG. 6 and uses an SF 16 in order to transmit maximum information for the ACK/NACK. When the SF has a value of 16, the total number of bits capable of being transmitted through the downlink common channel is 88. As shown in the reference number 703, since M bits are required for one ACK/NACK information and the total number of the ACK/NACK information, is the K (16*N), the total number of bits, transmitted through the downlink common channel, is K*M. To transmit the K*M bits, downlink common channels larger than (K*M)/88, that is, time slots allocated in the downlink common channels, are required. Herein, the required number of downlink common channels is defined as a P.

Referring to FIG. 7B, channels from channel #1 704 to channel #P 718 are downlink common channels for transmitting the ACK/NACK. A portion hatched by oblique lines represents a midamble portion. The first bit 706 of the first data transmission portion of the channel 704 corresponds to the first encoded bit $B_1^{(1)}$ of the ACK/NACK for the first code channel. The second encoded bit $B_2^{(1)}$ corresponds to the first bit 710 of the second data transmission portion of the channel 704. The third encoded bit $B_3^{(1)}$ corresponds to the encoded bit 707 just after the first encoded bit $B_1^{(1)}$. Further, the fourth encoded bit $B_4^{(1)}$ corresponds to the encoded bit 711 just after the second encoded bit $B_2^{(1)}$.

The reason for inserting the encoded bits into two data transmission portions and alternatively transmitting the encoded bits as described above instead of allowing the encoded bits to continuously correspond to the two data transmission portions is to obtain an interleaving effect. The interleaving effect achieves error correction by changing the sequence of transmitted bits, thereby continuously changing occurring errors to randomly occurring errors in demodulation at the receiver side. Accordingly, in transmitting the ACK/NACK, inserting the M encoded ACK/NACK bits into the two data transmission portions and alternatively transmitting the ACK/NACK bits reduces the error rate, instead of continuously transmitting the M encoded ACK/NACK bits. Herein, it is preferred that the M is set to an even number so as to alternatively dispose the encoded ACK/NACK bits in the two data transmission portions.

The (M−1)$^{th}$ bit $B_{M-1}^{(1)}$ and the M$^{th}$ bit $B_M^{(1)}$ for the first code channel correspond to the corresponding bits 708 and 712, and then the first encoded bit $B_1^{(2)}$ of the ACK/NACK for the second code channel correspond to the bit 709 after the bit $B_{M-1}^{(1)}$. Similarly to the first code channel, the ACK/NACK bits of the second code channel alternatively correspond to the corresponding bits 709 and 713 of the two data transmission portions.

The first encoded bit $B_1^{(j)}$ of the ACK/NACK for data transmitted by means of the j$^{th}$ code channel is transmitted through the corresponding bit 714 of the first data transmission portion in the corresponding i$^{th}$ channel 705. The second encoded bit $B_2^{(j)}$ of the ACK/NACK for the i$^{th}$ code channel is transmitted through the corresponding bit 716 of the second data transmission portion. The third encoded bit $B_3^{(j)}$ is transmitted through the bit 715 after the first encoded bit $B_1^{(j)}$ of the first data transmission portion. The fourth encoded bit $B_4^{(j)}$ is transmitted through the bit 717 after the second encoded bit $B_2^{(j)}$ of the second data transmission portion. The ACK/NACK bits for the last k$^{th}$ code channel are transmitted through the last downlink common channel 718 in FIG. 7B and the corresponding bits 719 to 722 alternatively exist in the two data transmission portions as described above.

To recognize the ACK/NACK transmission position of the UEs, the node B must recognize the time slot and the channel code allocated the downlink common channel, along with the value of M. Further, information for the downlink common channel is information received from the node B and recognized by the UE in advance before starting the uplink enhancement. The M value may also be transferred to the node B and the UEs through the signaling of an upper layer. The UEs may recognize the bit position, which is indicated by the time slot and the code channel transmitted from the UEs, on the downlink common channel through the M value. Further, the node B may recognize data, which correspond to the ACK/NACK transmitted from the UEs, without separate signaling information.

For example, when the M is 2 and the N is 5, the total number of code channels is 80 (16*5). Since one ACK/NACK information has a length of two bits, the total number of ACK/NACK bits is 160 (80*2). Accordingly, in order to transmit the ACK/NACK bits, about 2 (160/88=1.8181) downlink common channels are required.

At the same time, one UE transmits data upward by means of the tenth channel code of the TS #3. Herein, since the index of the code channel is 42(2*16+10), the transmission position of the ACK/NACK for the data corresponds to the 42$^{nd}$ code channel. Since the number of bits, which must be transmitted in the first data transmission portion of the first downlink common channel for ACK/NACK information of code channels before the 42 code channel, is 41 (41*2/2), the first bit of the ACK/NACK information for the 42$^{nd}$ code channel is transmitted from the 42$^{nd}$ bit position of the first data transmission portion. The second bit is transmitted from the 42$^{nd}$ bit position of the second data transmission portion. Accordingly, the UE recognize an ACK/NACK for the data transmitted using the tenth channel code of the TS #3 by decoding the two bits.

Figure 8A:
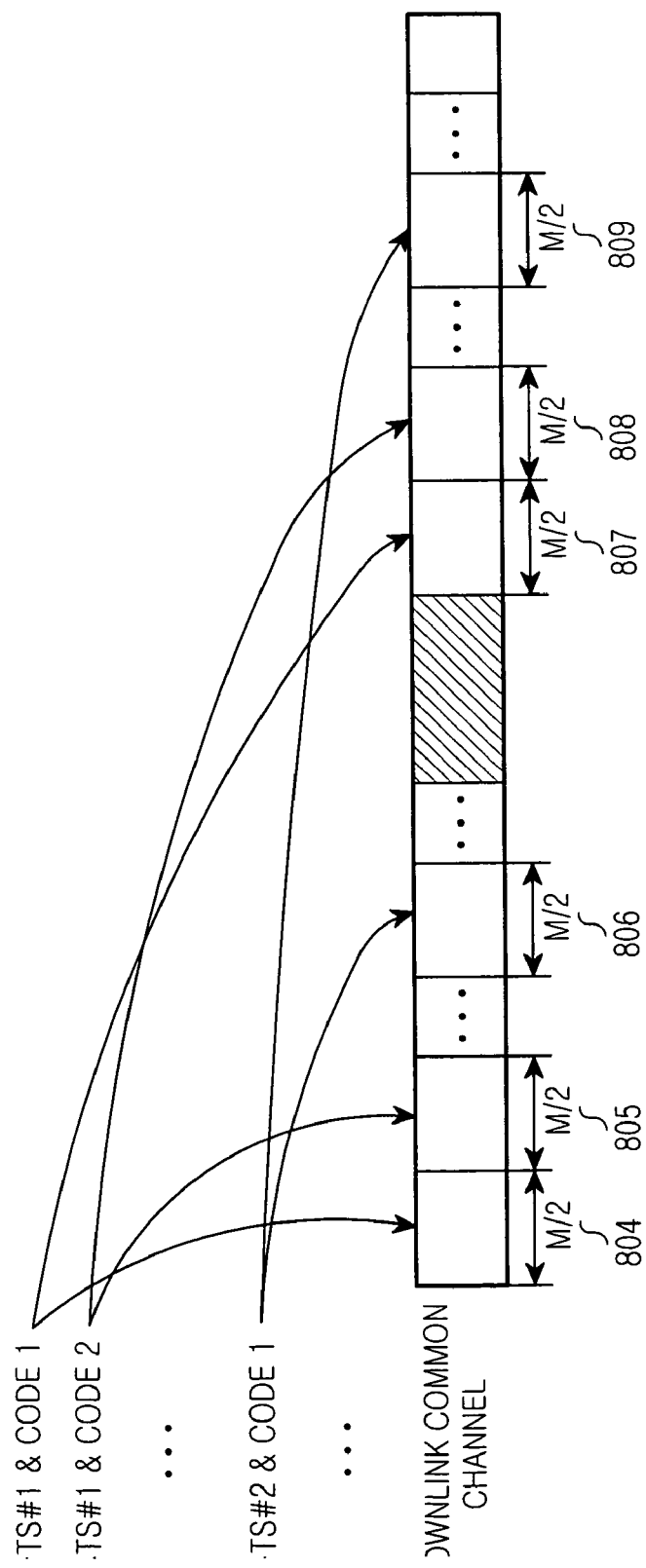
FIGS. 8A and 8B are diagrams illustrating two different embodiments for allowing ACK/NACK bits to corresponds to a downlink common channel according to the present invention.
Figure 8B:
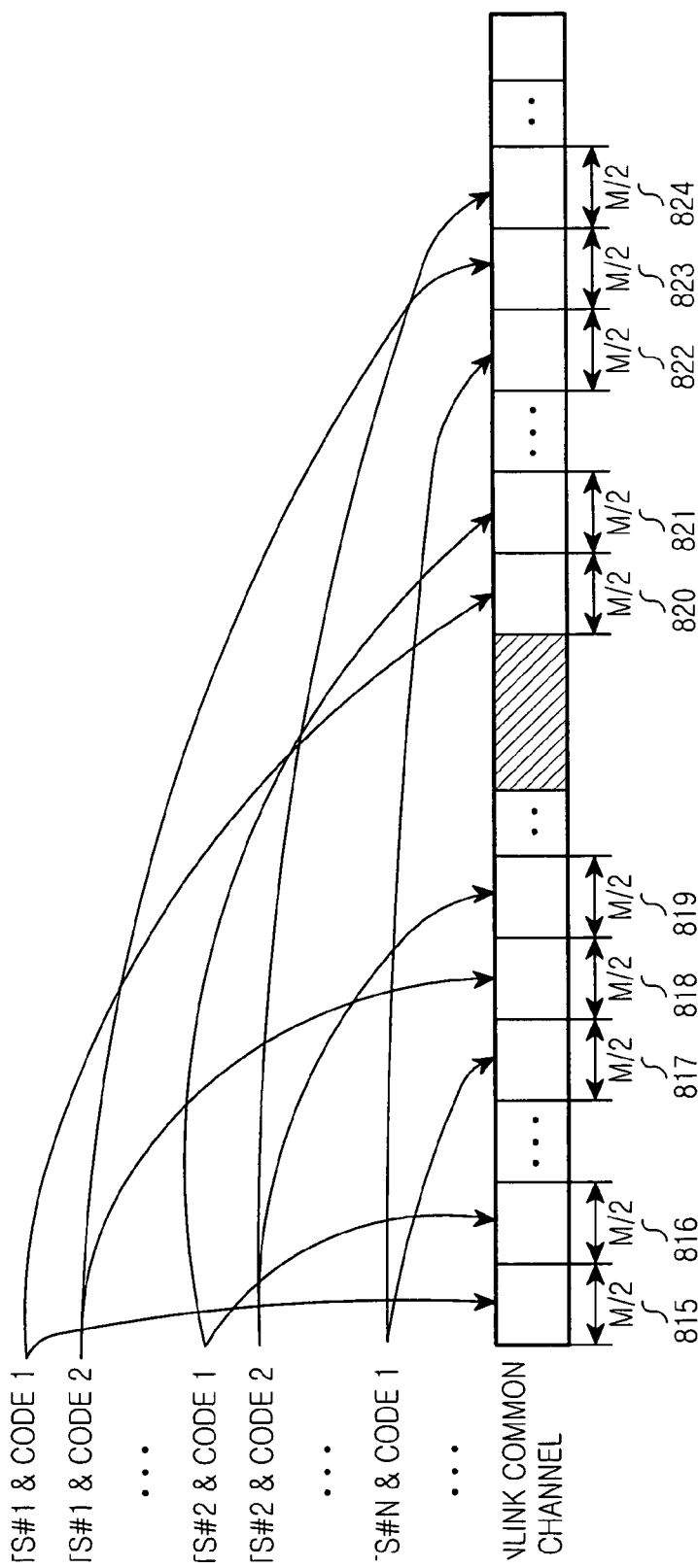

FIGS. 8A and 8B are diagrams illustrating two different embodiments, which allow ACK/NACK bits to corresponds to a downlink common channel with respect to an ACK/

NACK transmission scheme, according to an embodiment of the present invention. In FIGS. 8A and 8B, each bit size of portions, which are distinguished from each other by a block, is M/2.

Referring to FIG. 8A, the ACK/NACK bits are transmitted from a node B through the downlink common channel and plural UEs check an ACK/NACK for data, which have been transmitted upward, through the downlink common channel. From among the UEs, a UE #1 having transmitted data by means of the channel code 801 of the TS #1 determines an ACK or a NACK for the data in consideration of ACK/NACK bits transmitted from transmission positions 804 and 807 corresponding to the channel code 801 of the TS #1. A UE #2 having transmitted data by means of the channel code 802 of the TS #1 checks ACK/NACK bits transmitted from transmission positions 805 and 808 corresponding to the channel code 802 of the TS #1. Further, a UE #3 using the channel code 803 of the TS #2 in FIG. 8A receives ACK/NACK bits from transmission positions 806 and 809 corresponding to the channel code 803 of the TS #2, decodes the received ACK/NACK bits, and determines whether it receives an ACK or a NACK. When the result is an ACK, the UEs transmit new data. In contrast, when the result is a NACK, the UEs retransmit data previously transmitted.

Referring to FIG. 8B, there exists a difference in a sequence in which an ACK/NACK transmission position of each code channel corresponds to a downlink common channel. That is, each code channel is aligned according to a code number instead of a sequence of a time slot. In other words, the channel code 810 of the TS #1 corresponds to the portions 815 and 820, the channel code 812 of the TS #2 corresponds to the portions 816 and 821, and the channel code 814 of the TS #N corresponds to the portions 817 and 822. Then, the channel code 811 of the TS #1 corresponds to the portions 818 and 823 and the channel code 813 of the TS #2 corresponds to the portions 819 and 824.

The aforementioned scheme has an advantage in that the required number of downlink common channels can be reduced when UEs using a HARQ uniformly exist in plural time slots and channel codes are sequentially allocated to the UEs for a HARQ in each time slot. As the number of UEs using one time slot increases, so does the amount of interference from other UEs. Therefore, it is efficient to uniformly distribute the UEs in available time slots. Further, where UEs using the HARQ coexist with UEs not using the HARQ, channel codes are preferentially allocated to the UEs using the HARQ, so that UEs not using the HARQ will occupy only one portion of a downlink common channel making it possible to reduce the waste of channel resources.

Figure 9:
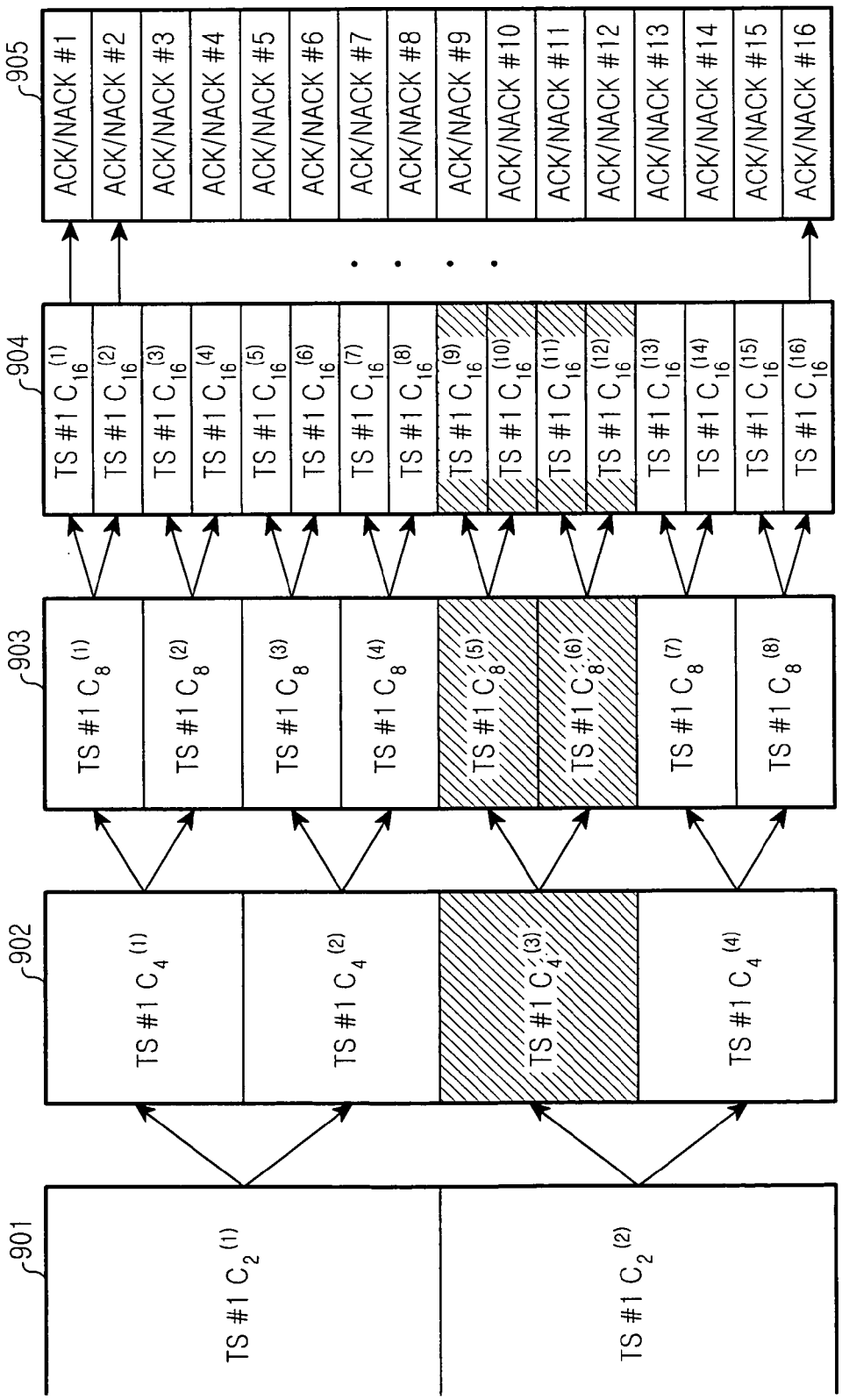
FIG. 9 is a diagram illustrating a position relation between channel codes of each time slot and an ACK/NACK when UEs using code channels including different SFs exist according to a preferred embodiment of the present invention.

FIG. 9 is a diagram illustrating a case where UEs use code channels including different SFs according to a preferred embodiment of the present invention.

Hereinafter, a corresponding scheme of ACK/NACK bits when the SF of code channels of a specific time slot is not 16 will be described with reference to FIG. 9. When the SF is 16, a corresponding relation between the code channels 904 and the ACK/NACK 905 coincides with that of FIG. 7. A position of a downlink common channel through which the ACK/NACK 905 is transmitted is as described above. The code channels when the SF is 8 are arranged as shown in the reference number 903. The code channels 904 when the SF is 16 and the code channels 903 when the SF is 8 have the corresponding relation as shown in FIG. 9. That is, a UE using a code channel $C_8(2)$ when the SF is 8 uses an ACK/NACK #3 and an ACK/NACK #4, similarly to a UE (UEs) using code channels $C_{16}(3)$ and $C_{16}(4)$ when the SF is 16. In the same way, the code channels when the SF is 4 are aligned as shown in the reference number 902.

For example, a code channel $C_4(3)$ when the SF is 4 corresponds to code channels 9 to 12 when the SF is 16. Accordingly, a UE receiving the code channel $C_4(3)$ when the SF is 4 uses the ACKs/NACKs 9 to 12.

Even though UEs with different SFs occupy one time slot as described above, an overlap does not occur in a corresponding relation with each ACK/NACK. Accordingly, in the corresponding relation when the SF is 16 as shown in FIG. 7, the corresponding relation of different SFs may be used as is. Herein, a UE using a smaller SF may transmit ACK/NACK information many bits as compared with a UE using a larger SF.

As described above, according to the present invention, when a HARQ is used in performing uplink enhancement for uplink packet transmission, a downlink common channel is used for transmitting an ACK/NACK representing whether retransmission must be performed, so that the number of channels required for a downlink signaling can be reduced. Further, according to the present invention, a transmission position of an ACK/NACK is standardized in the downlink common channel, so that signaling overhead can be reduced. As a result, UEs can quickly determine an ACK or a NACK.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for transmitting, by a Node B, to a User Equipment (UE), an Acknowledge/Negative-Acknowledge (ACK/NACK) for uplink packet data in a wireless mobile communication system, the method comprising the steps of:
   receiving the uplink packet data transmitted from the UE;
   generating ACK/NACK information as M bits by repeatedly coding a bit, representing whether the uplink packet data includes an error, by using a predetermined number of times of repetition coding, where M is an integer greater than 0; and
   transmitting the ACK/NACK information for the uplink packet data on a downlink channel to the UE,
   wherein the number of times of the repetition coding is determined according to a channel environment and a number of UEs.

2. The method of claim 1, wherein the downlink channel is a downlink data channel or a downlink control channel.

3. The method of claim 1, wherein the ACK/NACK information is transmitted on a transmission position of the downlink channel, and the transmission position corresponds to a transmission position of the uplink channel through which the uplink packet data was received.

4. A Node B for transmitting to a User Equipment (UE) an Acknowledge/Negative-Acknowledge (ACK/NACK) for uplink packet data in a wireless mobile communication system, the Node B comprising:
   a receiver for receiving the uplink packet data transmitted from the UE;
   a transmitter for transmitting ACK/NACK information for the uplink packet data on a downlink channel to the UE; and a controller for generating the ACK/NACK information as M bits by repeatedly coding a bit, representing whether the uplink packet data includes an error, by using a predetermined number of times of repetition coding, where M is an integer greater than 0, wherein the number of times of the repetition coding is determined according to a channel environment and a number of UEs.

5. The Node B of claim 4, wherein the downlink channel is a downlink data channel or a downlink control channel.

6. The Node B in claim 4, wherein the ACK/NACK information is transmitted on a transmission position of the downlink channel, and the transmission position corresponds to a transmission position of the uplink channel through which the uplink packet data was received.

7. A method for receiving Acknowledge/Negative-Acknowledge (ACK/NACK) for uplink packet data from a Node B in a wireless mobile communication system, the method comprising the steps of:

transmitting the uplink packet data to the Node B; and receiving, from the Node B, ACK/NACK information for the uplink packet data on a downlink channel;

wherein the ACK/NACK information represents whether the uplink packet data includes an error and is generated as M bits by using a predetermined number of times of repetition coding, where M is an integer greater than 0, and the number of times of the repetition coding is determined according to a channel environment and a number of UEs.

8. The method of claim 7, wherein the downlink channel is a downlink data channel or a downlink control channel.

9. The method in claim 7, wherein the ACK/NACK information is received on a transmission position of the downlink channel, and the transmission position corresponds to a transmission position of the uplink channel through which the uplink packet data was transmitted.

* * * * *